US011995322B2

(12) United States Patent
Dong et al.

(10) Patent No.: US 11,995,322 B2
(45) Date of Patent: May 28, 2024

(54) METHOD, DEVICE, AND PROGRAM PRODUCT FOR MANAGING COMPUTING SYSTEM BASED ON CLIENT/SERVER ARCHITECTURE

(71) Applicant: EMC IP Holding Company LLC, Hopkinton, MA (US)

(72) Inventors: Jibing Dong, Beijing (CN); Jian Gao, Beijing (CN); Jianbin Kang, Beijing (CN); Hongpo Gao, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/738,270

(22) Filed: May 6, 2022

(65) Prior Publication Data
US 2023/0004309 A1    Jan. 5, 2023

(30) Foreign Application Priority Data

Jul. 1, 2021    (CN) .......................... 202110743316.X (51) Int. Cl.
*G06F 3/00* (2006.01)
*G06F 3/06* (2006.01)

(52) U.S. Cl.
CPC .......... *G06F 3/0619* (2013.01); *G06F 3/0631* (2013.01); *G06F 3/0659* (2013.01); *G06F 3/067* (2013.01); *G06F 3/0689* (2013.01)

(58) Field of Classification Search
CPC .... G06F 3/0619; G06F 3/0631; G06F 3/0659; G06F 3/067; G06F 3/0689
See application file for complete search history.

(56) References Cited

U.S. PATENT DOCUMENTS

| | | | |
|---|---|---|---|
| 7,028,216 B2 | 4/2006 | Aizawa et al. | |
| 11,294,588 B1 | 4/2022 | Miller et al. | |
| 2007/0038822 A1* | 2/2007 | Correl ................. | G06F 11/1466 711/162 |
| 2007/0174657 A1* | 7/2007 | Ahmadian .......... | G06F 11/2046 714/E11.073 |
| 2012/0124183 A1* | 5/2012 | Long .................... | G06F 3/0622 709/219 |
| 2021/0286676 A1 | 9/2021 | Zhuo et al. | |
| 2022/0091738 A1 | 3/2022 | Patil et al. | |
| 2022/0100712 A1 | 3/2022 | Nuttle | |
| 2022/0308791 A1* | 9/2022 | Jayaram Masti ..... | G06F 3/0611 |

\* cited by examiner

*Primary Examiner* — Craig S Goldschmidt
(74) *Attorney, Agent, or Firm* — BainwoodHuang (57) ABSTRACT

A technique manages a computing system based on a client/server architecture. In particular, an address mapping of a storage system is managed. The address mapping includes an association between storage spaces in a plurality of storage devices in the storage system and a user of the storage system. A data access service is provided to a client associated with the user based on the address mapping. The client includes at least any one of a user data client for accessing user data associated with the user in the storage system and a control data client for accessing control data associated with the user. Based on a client/server architecture, a uniform management mode is provided for user data and control data, so that the storage system is managed more simply and effectively.

21 Claims, 9 Drawing Sheets

METHOD, DEVICE, AND PROGRAM PRODUCT FOR MANAGING COMPUTING SYSTEM BASED ON CLIENT/SERVER ARCHITECTURE

CROSS-REFERENCE TO RELATED APPLICATION

This application claims priority to Chinese Patent Application No. CN202110743316.X, on file at the China National Intellectual Property Administration (CNIPA), having a filing date of Jul. 1, 2021, and having "METHOD, DEVICE, AND PROGRAM PRODUCT FOR MANAGING COMPUTER SYSTEM BASED ON CLIENT/SERVER ARCHITECTURE" as a title, the contents and teachings of which are herein incorporated by reference in their entirety.

TECHNICAL FIELD

Various implementations of the present disclosure relate to a storage system, and more particularly, to a method, a device, and a computer program product for managing a storage system based on a client/server architecture.

BACKGROUND

With the development of data storage technologies, a variety of data storage devices have been able to provide users with increasingly high data storage capacities and at greatly improved data access speed. While data storage capabilities are improved, users also have increasingly high demands for data reliability and storage system response time. At present, various data storage systems based on a Redundant Array of Independent Disks (RAID) have been developed to improve data reliability. When one or more disks in a storage system fail, data in the failed disks may be reconstructed from data on other normally operating disks.

A Mapped RAID has been developed at present. In the mapped RAID, a disk is a logical concept and may include a plurality of extents. A plurality of extents included in a logical disk may be distributed on different physical storage devices in a resource pool. For a plurality of extents in one stripe of the mapped RAID, the plurality of extents should be distributed on different physical storage devices. This makes it possible to perform, when a physical storage device where one of the plurality of extents is located fails, a reconstruction operation to restore data from physical storage devices where other extents are located.

The storage system may include user data representing stored data per se, such as a user's documents, images, and videos, and control data representing data required to maintain normal operation of the storage system, such as metadata related to user data. During the operation of the storage system, how to manage various types of data in the storage system becomes a technical problem.

SUMMARY OF THE INVENTION

Therefore, it is desirable to develop and implement a technical solution for managing a storage system more effectively. It is desirable that the technical solution is compatible with existing storage systems, and by modifying various configurations of the existing storage systems, a storage system may be managed more effectively.

According to a first aspect of the present disclosure, a method for managing a storage system is provided. The method is implemented at a server of the storage system. In this method, an address mapping of the storage system is managed. The address mapping includes an association between storage spaces in a plurality of storage devices in the storage system and a user of the storage system. A data access service is provided to a client associated with the user based on the address mapping. The client includes at least any one of a user data client for accessing user data associated with the user in the storage system and a control data client for accessing control data associated with the user.

According to a second aspect of the present disclosure, an electronic device is provided, including: at least one processor; and a memory coupled to the at least one processor, where the memory has instructions stored therein which, when executed by the at least one processor, cause the device to perform the method according to the first aspect of the present disclosure.

According to a third aspect of the present disclosure, a computer program product is provided, which is tangibly stored on a non-transitory computer-readable medium and includes machine-executable instructions, where the machine-executable instructions are used to perform the method according to the first aspect of the present disclosure.

DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of examples rather than limitation. In the accompanying drawings, FIG. 1 schematically shows a block diagram of a storage system according to a technical solution.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will be described in more detail below with reference to the accompanying drawings. Although the preferred implementations of the present disclosure are illustrated in the accompanying drawings, it should be understood that the present disclosure may be implemented in various forms and should not be limited by the implementations illustrated herein. Instead, these implementations are provided in order to make the present disclosure more thorough and complete, and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one exemplary embodiment" and "one embodiment" mean "at least one exemplary embodiment." The term "another implementation" means "at least one additional implementation." The terms "first," "second," and the like may refer to different or identical objects. Other explicit and implicit definitions may also be included below.

Figure 1:
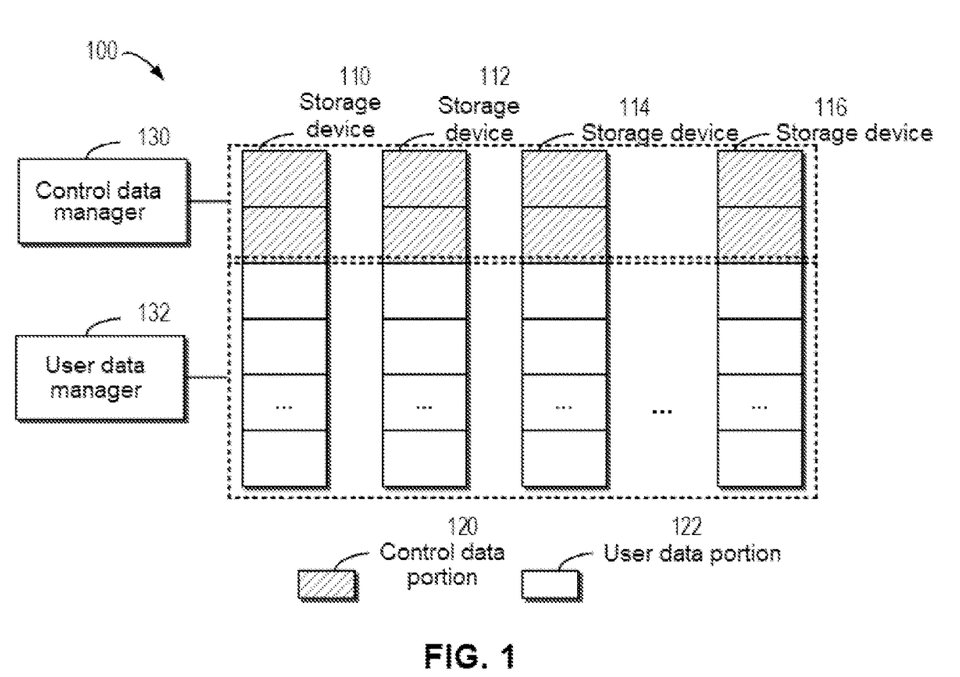

Firstly, an overview of a storage system will be described with reference to FIG. 1. FIG. 1 schematically shows a block diagram of storage system 100 according to a technical solution. As shown in FIG. 1, storage system 100 may include a plurality of storage devices 110, 112, 114, . . . , and 116. Each storage device may include a plurality of extents, and the plurality of extents may be managed based on a mapped RAID. It will be appreciated that data in the storage system may include user data and control data. In general, the two types of data may have different priorities. For example, the control data requires higher reliability and response speed, and the user data may have lower requirements in both aspects than the control data.

To facilitate management of the storage system, a storage space in the storage device may be divided into a control data portion (as shown in legend 120) and a user data portion (as shown in legend 122). The two portions are separately managed via control data manager 130 and user data manager 132, respectively. At this time, two independent managers exist in the storage system, which increases the management complexity of the storage system. Further, storage spaces pre-allocated to the control data and the user data are fixed, and the storage spaces of the two types of data cannot be dynamically adjusted during the operation of the storage system.

Figure 2:
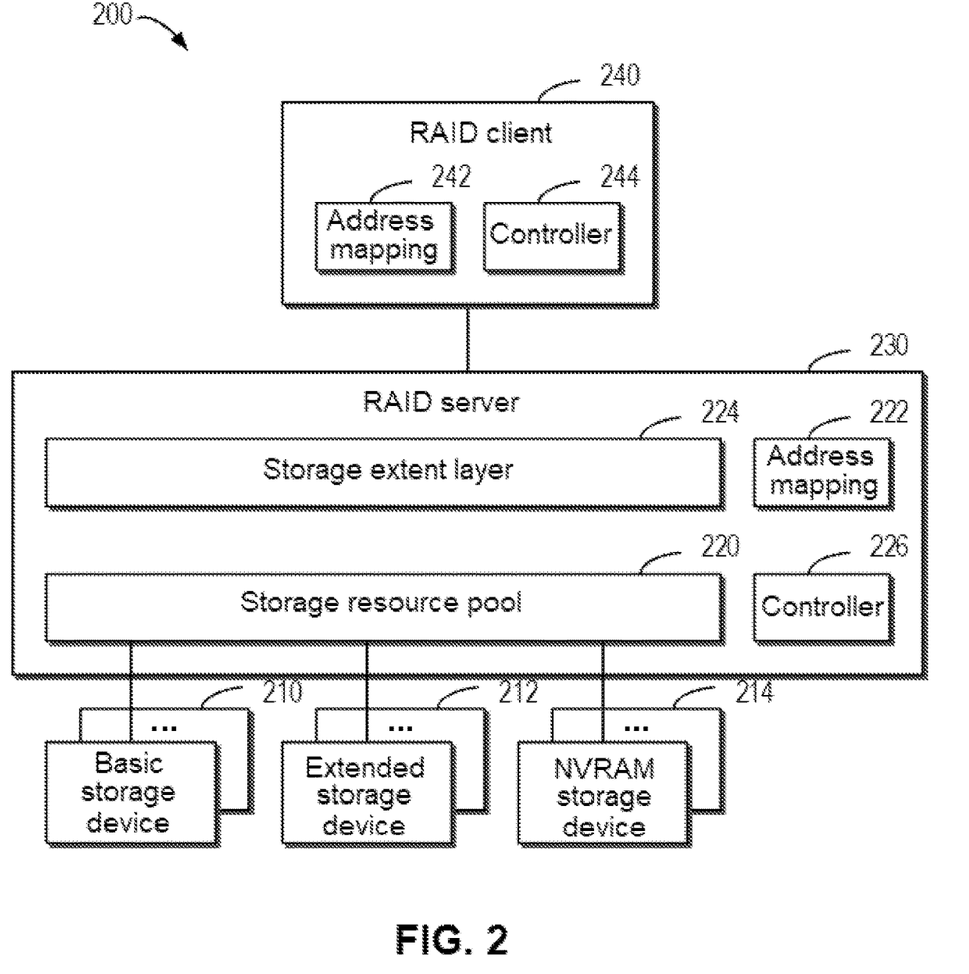
FIG. 2 schematically shows a block diagram of a storage system according to an example implementation of the present disclosure.

In order to address the defects in existing technical solutions, an example implementation of the present disclosure proposes a technical solution for managing a storage system. Hereinafter, an overview of an example implementation according to the present disclosure will be described with reference to FIG. 2. FIG. 2 schematically shows a block diagram of storage system 200 according to an example implementation of the present disclosure. FIG. 2 schematically shows a storage system based on a client/server architecture. RAID server 230 may include controller 226 for managing physical storage devices in the storage system, maintaining an address mapping between an upper-layer data storage space and users, monitoring health conditions of storage devices, managing increase and decrease of storage devices, managing spare storage devices, reconstructing data in the storage system, etc.

As shown in FIG. 2, the physical storage devices may include basic storage device 210, extended storage device 212, and non-volatile random access memory (NVRAM) storage device 214. Here, basic storage device 210 may represent a storage device in the storage system before extension, extended storage device 212 may represent a storage device in the storage system after extension, and NVRAM storage system 214 may represent a storage device for performing a high-speed access. The storage spaces in these physical storage devices may be added to storage resource pool 220.

Further, the storage space in storage resource pool 220 may be divided into a plurality of smaller extents, and these extents may be added to storage extent layer 224 for allocation to users. Address mapping 222 may include an address mapping associated with extents allocated to respective users. At this time, it is not necessary to divide the respective storage devices into a control data portion and a user data portion according to a predetermined ratio, but to manage the respective storage devices uniformly. With example implementations of the present disclosure, control data and user data will not be distinguished, but rather uniform RAID server 230 is employed to manage the space in the storage system. In other words, RAID server 230 will manage two types of data simultaneously.

According to an example implementation of the present disclosure, RAID client 240 for connecting to a server is further provided to maintain an address mapping associated with a user, serve access requests from user equipment, receive and forward requests to increase/decrease a storage space from the user equipment, perform reconstruction operations, etc. Specifically, RAID client 240 may include address mapping 242 associated with a user, and a data access request associated with the user is managed via controller 244. It will be appreciated that for a certain user, a user data client and a control data client may be started respectively. Here, the user data client is used to access user data associated with the user in the storage system, and the control data client is used to access control data associated with the user. RAID client 240 may cooperate with RAID server 230 to manage storage system 200.

Figure 3:
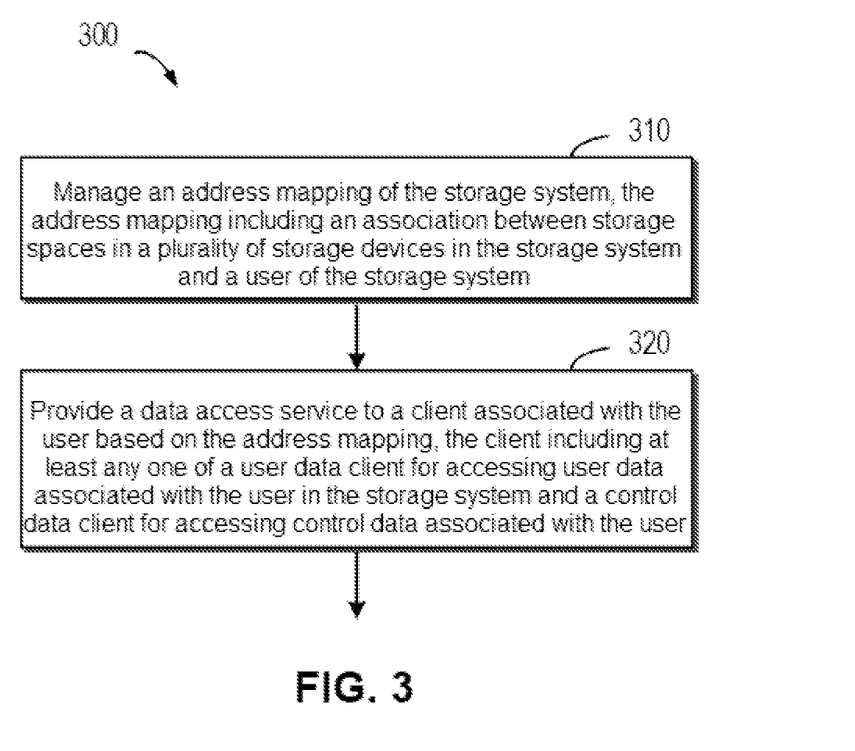
FIG. 3 schematically shows a flow chart of a method for managing a storage system according to an example implementation of the present disclosure.

Hereinafter, more details of an example implementation according to the present disclosure will be described with reference to FIG. 3. FIG. 3 schematically shows a flow chart of method 300 for managing a storage system according to an example implementation of the present disclosure. At block 310, an address mapping of the storage system is managed. The address mapping includes an association between storage spaces in a plurality of storage devices in the storage system and a user of the storage system. In other words, the address mapping may indicate which storage spaces in the plurality of storage devices are allocated to the user. According to an example implementation of the present disclosure, storage spaces in a plurality of storage devices may be divided into a plurality of extents at server 230. Hereinafter, more details about the address mapping will be described with reference to FIG. 4.

Figure 4:
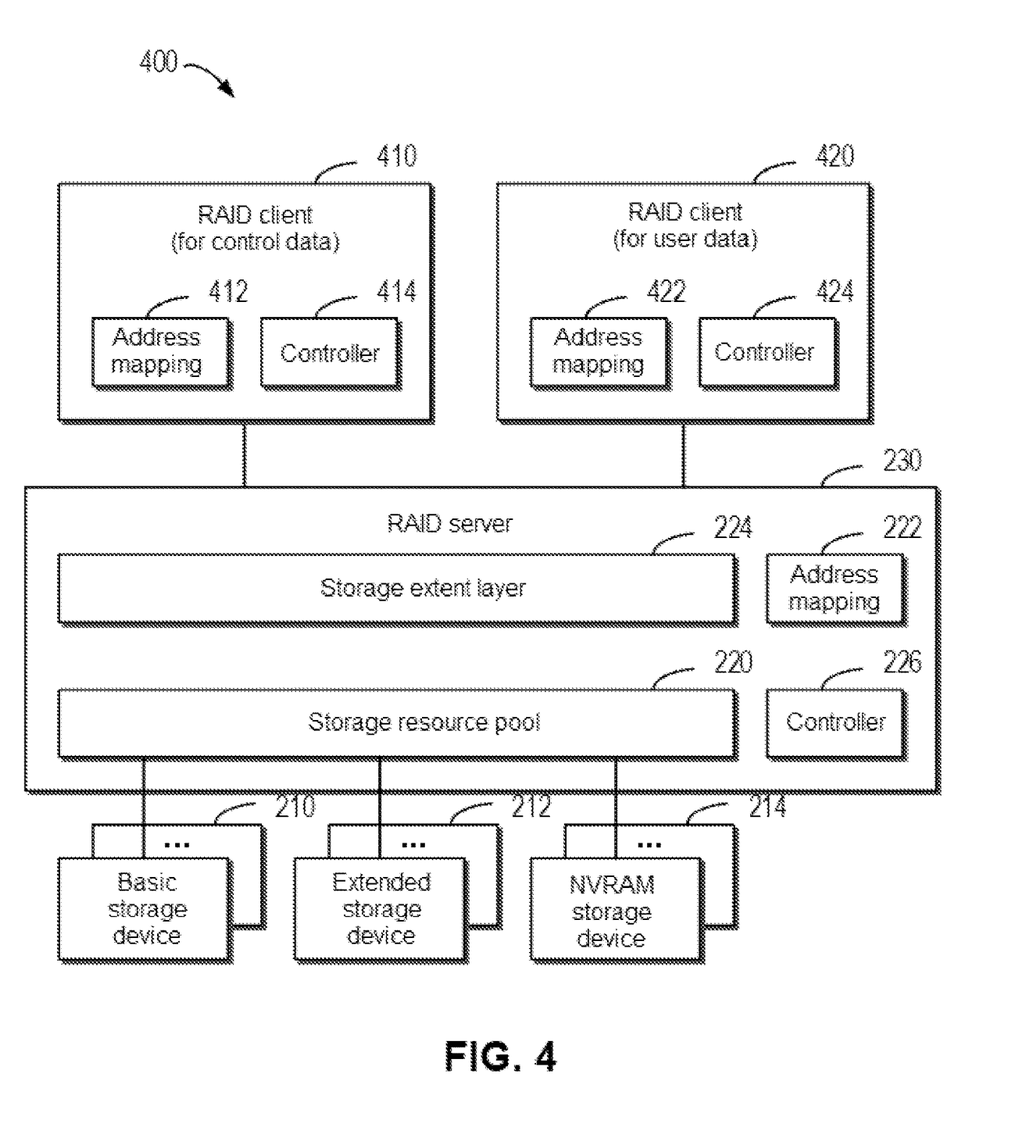
FIG. 4 schematically shows a block diagram for managing a storage system based on a client/server architecture according to an example implementation of the present disclosure.

FIG. 4 schematically shows block diagram 400 for managing a storage system based on a client/server architecture according to an example implementation of the present disclosure. For example, each storage device may be divided into a plurality of larger extents according to a predetermined size, and a plurality of stripes are generated by using the larger extents from the plurality of storage devices based on a mapped RAID and placed into storage resource pool 220. Further, each stripe may be divided into a plurality of smaller extents (e.g., slices), which are placed onto storage extent layer 224.

According to an example implementation of the present disclosure, an address mapping may be provided for each user of the storage system. The address mapping may include an association between all users of storage spaces in a plurality of storage devices in the storage system. FIG. 4 only schematically shows address mapping 222 for one user. Although not shown in FIG. 4, address mapping 222 may include a portion for control data and a portion for user data, respectively. According to an example implementation of the present disclosure, when the storage system includes a plurality of users, each user may be separately provided with a corresponding address mapping.

Returning to FIG. 3, at block 320, a data access service is provided to a client associated with the user based on address mapping 222. It will be appreciated that RAID server 230 here may provide a uniform service interface for managing control data and user data. At this time, from the perspective of the user, RAID client 410 for control data and RAID client 420 for user data may be started, respectively. Both clients may be connected to RAID server 230 to access corresponding data in the storage system. Here, RAID client 410 may access user data associated with the user in the storage system, and RAID client 420 may access control data associated with the user.

As shown in FIG. 4, each client may include a corresponding address mapping and a corresponding controller. For example, address mapping 412 in RAID client 410 may include a backup of the portion for control data in address mapping 222, and address mapping 422 in RAID client 420 may include a backup of the portion for user data in address mapping 222. It will be appreciated that the address mapping at the client is read only, and when address mapping 222 at RAID server 230 is modified, RAID server 230 may synchronize the modified address mapping to the client.

During the operation of the storage system, RAID clients 410 and 420 may be connected to RAID server 230 to implement data access functions. At this time, it is not necessary to provide two separate sets of managers in the storage system to respectively manage the control data and the user data, but the functions of the storage system may be implemented uniformly by using a client/server architecture shown in FIG. 4. With the example implementation of the present disclosure, the setting and operational complexity of the storage system can be simplified, and management functions can be reused, thereby improving the performance of the storage system.

Figure 5:
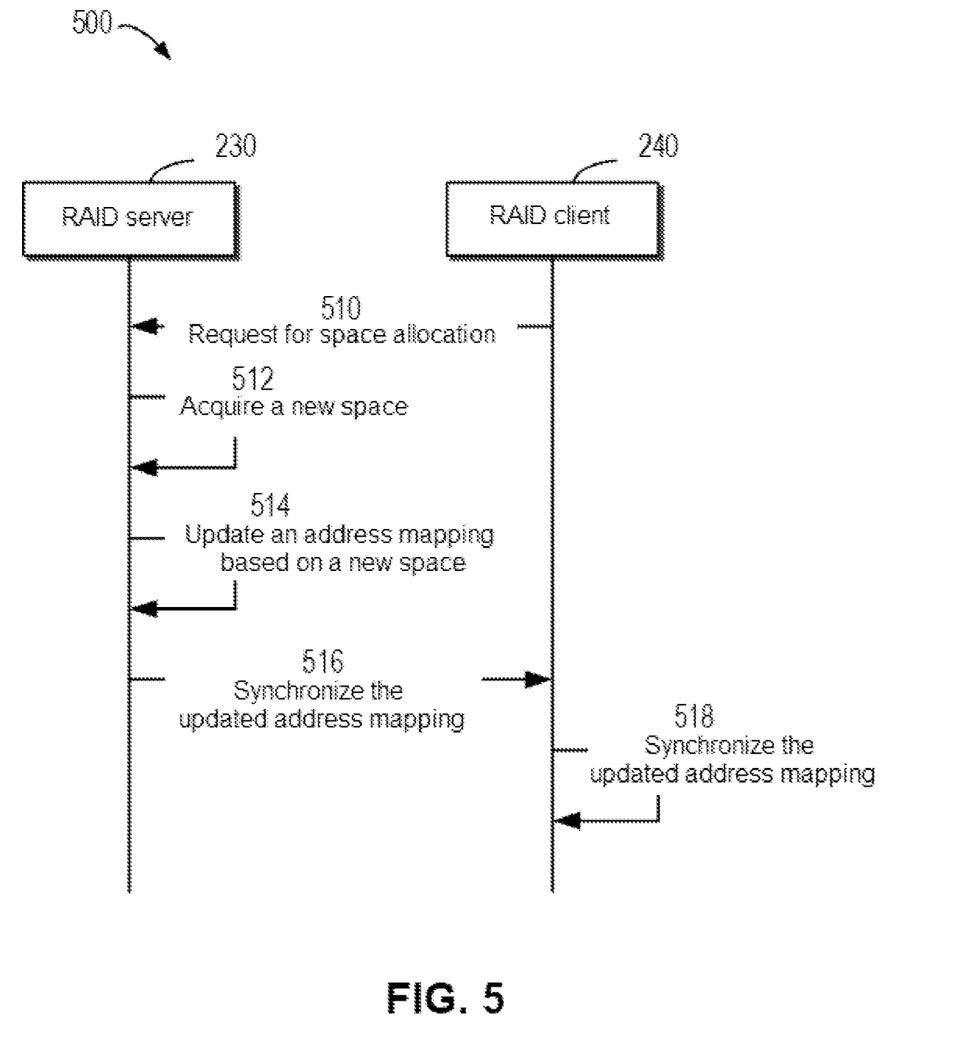
FIG. 5 schematically shows a block diagram for allocating a storage space to a user of a storage system according to an example implementation of the present disclosure.

Hereinafter, various types of services involved during the operation of the storage system will be described respectively. FIG. 5 schematically shows block diagram 500 for allocating a storage space to a user of a storage system according to an example implementation of the present disclosure. It will be appreciated that allocating a storage space here may involve allocating a storage space of control data and allocating a storage space of user data. When the storage space of the control data is in shortage, RAID client 410 may request RAID server 230 to allocate more storage spaces for storing the control data; and when the storage space of the user data is in shortage, RAID client 420 may request RAID server 230 to allocate more storage spaces for storing the user data.

According to an example implementation of the present disclosure, the data access service may include a space allocation service. Specifically, the server may acquire a target storage space from the plurality of storage devices according to the received allocation request from a client for allocating the storage space to the user. Further, the server may update the address mapping based on the target storage space and notify the client of the updated address mapping such that the client may access the target storage space via the updated address mapping.

For brevity, when describing the process shown in FIG. 5, RAID client 410 for control data and RAID client 420 for user data will not be distinguished, but RAID client 240 will be used to represent both clients. At this time, the allocation processes for both data are similar. As shown in FIG. 5, RAID client 240 may request (510) RAID server 230 to allocate more storage spaces. After receiving the request, RAID server 230 may acquire (512) a new space from allocatable extents in storage extent layer 224 and update (514) address mapping 222 at the server based on an address of the new space. RAID server 230 may then synchronize (516) the updated address mapping to RAID client 240 and inform that the allocation process has been completed. At this time, RAID client 240 may synchronize (518) the updated address mapping to local.

According to an example implementation of the present disclosure, the process of allocating a new space does not affect data in the storage space already allocated to the user, and RAID client 240 may continue to serve a data access request from user equipment. In other words, RAID client 240 does not need to suspend the data access request from the user equipment. After completing the operation shown in FIG. 5, the user obtains more storage spaces (storage space for control data and/or storage space for user data). The user equipment may be then connected to RAID client 240 and access the newly allocated storage space by using the already updated address mapping at RAID client 240.

In contrast to conventional technical solutions where two sets of managers need to be separately provided, RAID server 230 may provide a uniform allocation interface for both clients to request allocation of more storage spaces when needed. Further, according to the conventional technical solutions, the storage device is divided into a control data portion and a user data portion in advance, such that when the storage space for one kind of data is in shortage, the allocation cannot be continued. With the example implementation of the present disclosure, the type of each storage extent is not designated when storage extent layer 224 is established, but the type of a storage extent is specified when an allocation request from a client of a certain type is received. In this way, as long as storage extent layer 224 includes available extents, a corresponding type of storage extent may be allocated according to the type of the allocation request.

Specifically, upon receiving an allocation request from RAID client 410 for control data, available extents in storage extent layer 224 may be allocated to the user for storing control data; and upon receiving an allocation request from RAID client 420 for user data, available extents in storage extent layer 224 are allocated to the user for storing user data. In this way, the storage extent layer is common to both data types, thus alleviating the occurrence of shortage of available extents of a certain type. It will be appreciated that the control data and the user data may be stored in different ways in the storage system. For example, the control data may be stored in a mirrored manner to provide higher reliability. RAID 5, RAID 6, or other manners may be used to store the control data to maximize the utilization of the storage space while improving reliability.

Figure 6:
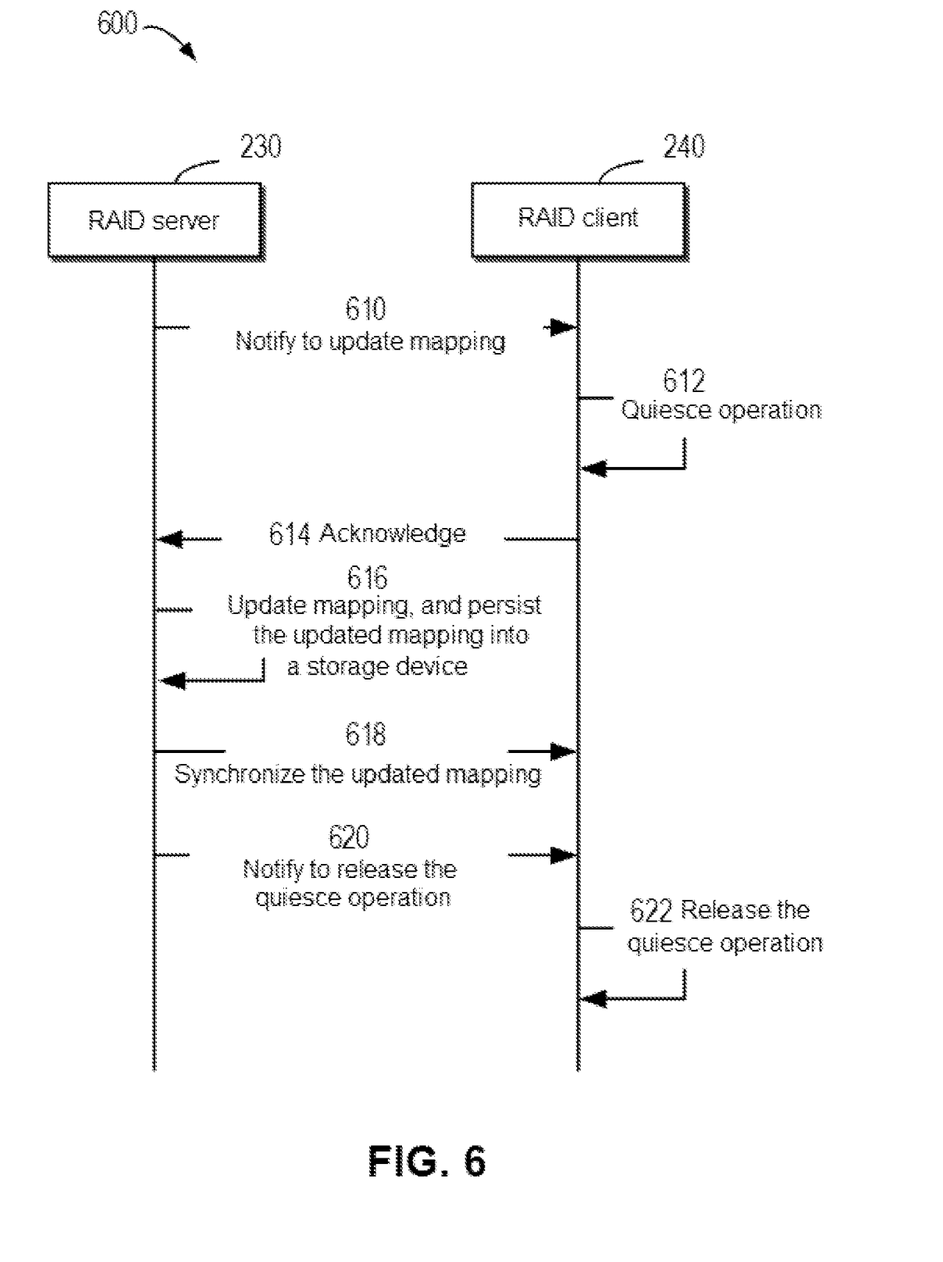
FIG. 6 schematically shows a block diagram for updating an address mapping in a storage system according to an example implementation of the present disclosure.

According to an example implementation of the present disclosure, the data access service may include an address mapping update service. Specifically, when it is determined that an address mapping needs to be updated, the server may notify the client of a target portion to be updated in the address mapping. The server may receive an acknowledgment from the client for the notification to begin updating the target portion in the address mapping and notify the client of the updated address mapping. Hereinafter, more details about the address mapping will be described with reference to FIG. 6. FIG. 6 schematically shows block diagram 600 for updating an address mapping in a storage system according to an example implementation of the present disclosure.

As shown in FIG. 6, RAID server 230 may notify (610) RAID client 240 to update an address mapping. It will be appreciated that RAID client 240 needs to serve a data access request from user equipment based on a copy of a local address mapping, and if the address mapping is updated at RAID server 230, a copy of the address mapping at RAID client 240 will be inconsistent with the address mapping at RAID server 230, thereby causing a conflict. Thus, RAID client 240 needs to quiesce a data access request before updating the address mapping.

According to an example implementation of the present disclosure, RAID client 240 may perform (612) a quiesce operation upon receiving a notification from RAID server 230. The quiesce operation herein involves a data access request that has not been executed yet and a data access request that is being executed. Specifically, the notification may instruct RAID client 240 to suspend a data access request for accessing the target portion in the address mapping which has not been executed yet. For example, an incoming data access request, if any, may be queued. The notification may also instruct RAID client 240 to wait for completion of a data access request for accessing the target portion which has already been executed. Assuming RAID client 240 is executing n (n is a positive integer) data access requests, these requests may be continuously executed until all of the n data access requests have been completed.

After completing the quiesce operation, RAID client 240 may acknowledge (614) to RAID server 230 that it is ready to perform an update of the address mapping and allow RAID server 230 to begin the update process. At this time, RAID server 230 may perform an update of the address mapping and persist the updated address mapping into a lower-layer storage device. RAID server 230 may then synchronize (618) the updated address mapping to RAID client 240. In other words, the updated address mapping is synchronized to RAID client 240. Here, the synchronization operation instructs the client to replace the copy of the address mapping at the client with the updated address mapping, where the copy of the address mapping at RAID client 240 is consistent with that at RAID server 230.

Further, after the updated address mapping has been all synchronized to RAID client 240, RAID server 230 may notify (620) RAID client 240 to release the quiesce operation. At this time, RAID client 240 may release (622) the quiesce operation and RAID client 240 may be restored to normal. If there is any data access request in the queue which has not been executed yet at this moment, RAID client 240 may process the requests in the queue sequentially. If there are no request in the queue, RAID client 240 may wait for a new data access request.

With the example implementation of the present disclosure, whether the address mapping to be updated involves control data or user data, it may be processed in the manner shown in FIG. 6. At this time, RAID server 230 may serve both control data and user data. If the address mapping to be updated involves control data, RAID server 230 may send a notification to RAID client 410 for the control data. If the address mapping to be updated involves user data, RAID server 230 may send a notification to RAID client 420 for the user data. In this way, the complexity of the operation of the storage system can be simplified, thereby improving the performance of the storage system.

Figure 7:
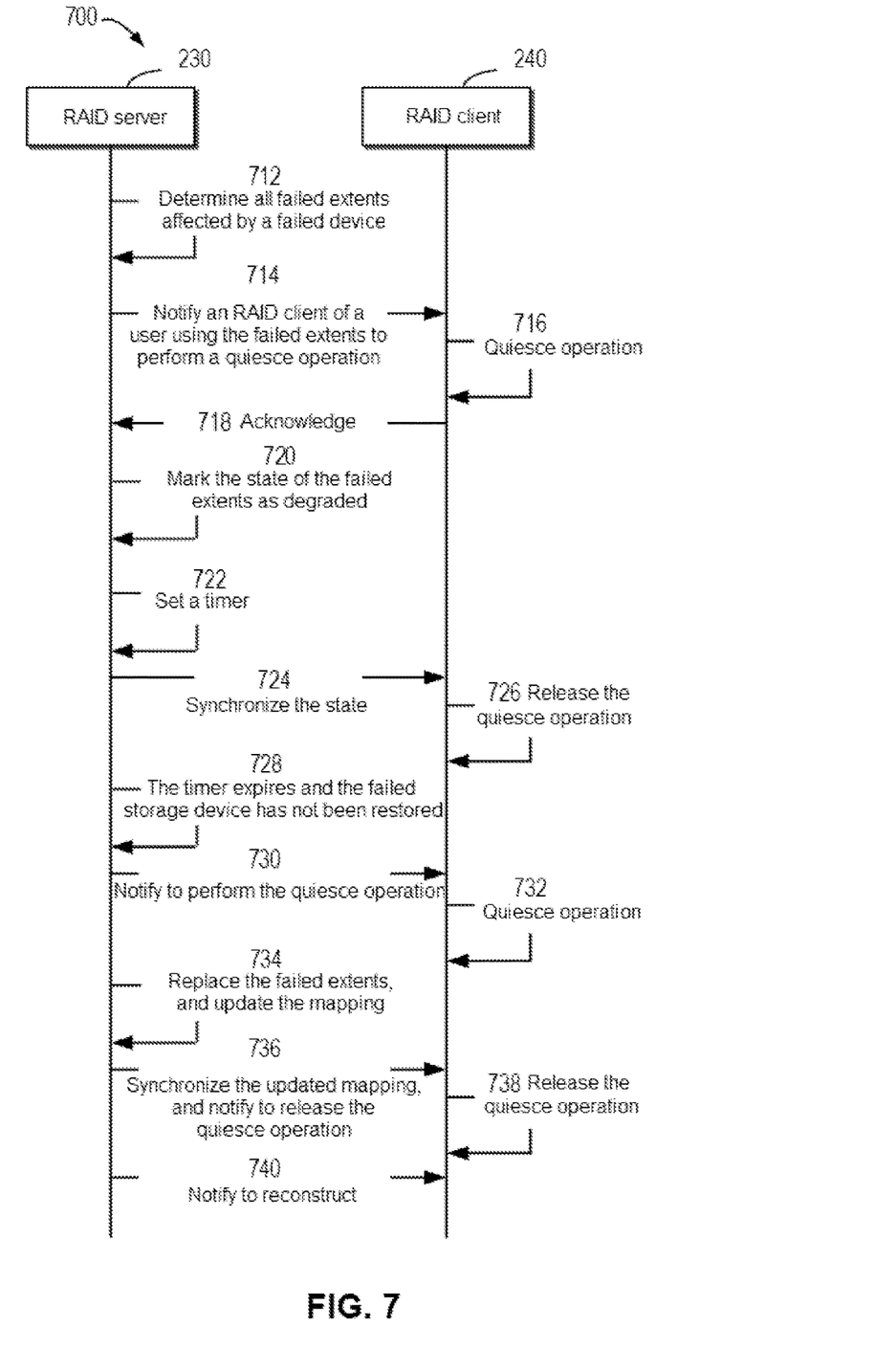
FIG. 7 schematically shows a block diagram for processing a failed storage device in a storage system according to an example implementation of the present disclosure.

According to an example implementation of the present disclosure, the data access service may include a failure processing service. If RAID server 230 determines that a failed storage device has occurred in the plurality of storage devices, a failure processing service may be initiated. Specifically, a failed storage space involving the failed storage device in the address mapping may be determined, and the corresponding client is notified of the failed storage space. Hereinafter, more details about the failure processing service will be described with reference to FIG. 7. FIG. 7 schematically shows block diagram 700 for processing a failed storage device in a storage system according to an example implementation of the present disclosure.

As shown in FIG. 7, after a failed storage device is detected, RAID server 230 may determine (712) all extents which are affected by the failed storage device. It will be appreciated that since the storage system is a mapped RAID-based storage system, one or more extents in storage extent layer 224 located in the failed storage device will be affected. At this time, the affected extents may be marked as failed extents. If the failed extents have not been allocated yet, the user won't be affected. If the failed extents have been allocated to a user, the user allocated with the failed extents may be found based on the address mapping, and RAID client 240 associated with the user is notified (714) of the failure. It will be appreciated that, if extents in the failed storage device have been allocated to a plurality of users, similar operations may be performed for each user. Hereinafter, description will be made by way of example only with respect to the operation for one user.

As shown in FIG. 7, RAID server 230 may notify (714) RAID client 240 to perform a quiesce operation. It will be appreciated that the presence of a failed storage device may cause some storage spaces in the local copy of the address mapping of RAID client 240 to be unavailable. Thus, RAID client 240 needs to stop service. Specifically, RAID client 240 may perform (716) a quiesce operation. According to an example implementation of the present disclosure, RAID client 240 may quiesce a data access request associated with the failed storage space and allow a data access request to a normal storage space. In the context of the present disclosure, the process of the quiesce operation is similar and will not be described in further detail. RAID client 240 may acknowledge (718) to RAID server 230 that the quiesce operation has been completed.

RAID server 230 may then mark (720) the state of the failed extents as "degraded." It will be appreciated that after a failure occurs, some failed storage devices may be restored to normal by rebooting, etc., but some failed storage devices may not be restored to normal. RAID server 230 may set (722) a timer (e.g., 5 minutes or other time intervals) to check whether the failed storage device may be restored to normal within a predetermined time length. RAID server 230 may then synchronize (724) the state of the extents and associated metadata to RAID client 240 and notify RAID client 240 to release the quiesce operation. RAID client 240 may then release (726) the quiesce operation.

At this time, RAID server 230 may determine subsequent processing operations based on a threshold time length associated with the failed storage device. If the failed storage device is restored within a predetermined threshold time length, it indicates that the failed storage device has restored to normal and may continue to be used. The state of the failed storage space may be restored from "degraded" to a normal state, and the client is notified that the failed storage device has been restored. Specifically, RAID server 230 may synchronize the latest state of the various extents and associated metadata to RAID client 240 to instruct that RAID client 240 may continue to process data access requests.

Continuing to describe the case where the failed storage device is not restored with reference to FIG. 7, RAID server 230 may detect (728) that the timer expires and the failed storage device has not been restored. This indicates that the failed storage device has not been restored within a predetermined threshold time length, and that the failed storage device cannot continue to be used. At this time, RAID server 230 may notify (730) RAID client 240 to perform the quiesce operation again. RAID client 240 may perform (732) the quiesce operation and inform RAID server 230 that the quiesce operation has been completed. Further, RAID server 230 may search for available spare extents in the storage system to replace (734) the failed extents. Specifically, each failed extent may be replaced by selecting an appropriate spare extent from storage extent layer 224 based on an RAID standard used. Further, the corresponding address mapping may be updated based on the addresses of respective normal extents.

After all failed extents have been replaced with normal extents and the address mapping at RAID server 230 has been updated, RAID server 230 may synchronize (736) the updated address mapping to RAID client 240 and notify RAID client 240 to release the quiesce operation. Specifically, RAID server 230 may instruct the client to update a copy of the address mapping at the client with the updated address mapping. At this time, the local address mapping at RAID client 240 has been updated, and all storage spaces involved in the address mapping are normal storage spaces and may be used. RAID client 240 may release (738) the quiesce operation and be restored to normal. At this time, the storage space in the address mapping at RAID server 230 and RAID client 240 also includes extents being in a "degraded" state, so RAID server 230 may notify (740) RAID client 240 to perform a reconstruction operation.

With the example implementation of the present disclosure, when processing a failed storage device, various extents in the failed storage device which are used to store control data or user data are not treated differently, but are provided with a uniform failure processing interface through RAID server 230. In this way, RAID server 230 may respectively notify corresponding RAID clients to perform the process shown in FIG. 7 according to the type of data included in the failed extents.

Figure 8:
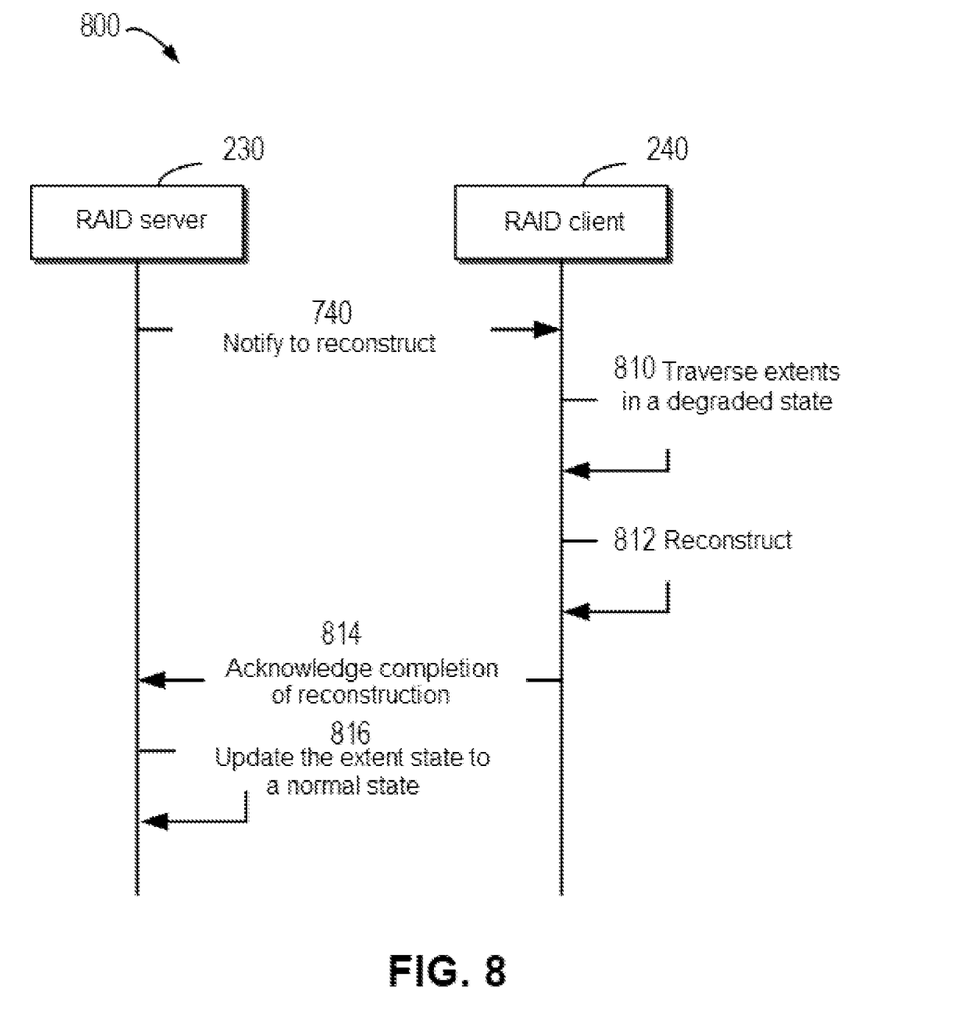
FIG. 8 schematically shows a block diagram for reconstructing data in a storage system according to an example implementation of the present disclosure.

According to an example implementation of the present disclosure, the data access service may include a reconstruction service. Specifically, RAID server 230 may initiate a reconstruction operation. Hereinafter, more details about the reconstruction will be described with reference to FIG. 8. FIG. 8 schematically shows block diagram 800 for reconstructing data in a storage system according to an example implementation of the present disclosure. As shown in FIG. 8, RAID server 230 may notify (740) RAID client 240 to initiate a reconstruction operation. At this time, RAID client 240 may traverse (810) all extents in a "degraded" state and perform (812) the reconstruction process based on the corresponding RAID standard. According to an example implementation of the present disclosure, the specific steps of the reconstruction process are similar to those of the conventional technical solutions and will not be described in detail. After the reconstruction operation has been completed for all the extents in a "degraded" state, RAID client 240 may acknowledge (814) to RAID server 230 that the reconstruction has been completed. At this time, RAID server 230 may update (816) the state of the relevant extents from "degraded" to normal.

With the example implementation of the present disclosure, during the reconstruction operation, extents in a "degraded" state which are used to store control data or user data are not treated differently, but are provided with a uniform data reconstruction interface through RAID server 230. In this way, RAID server 230 may respectively notify corresponding RAID clients to perform the reconstruction operation according to the type of data included in the "degraded" extents.

It will be appreciated that the specific process of how to manage a storage system based on a client/server architecture has been described above merely by way of example of allocating a storage space, updating an address mapping, processing a failed storage device, and performing a reconstruction operation. According to an example implementation of the present disclosure, other services may also be implemented in the storage system based on the client/server architecture based on the principles described above. For example, RAID client 240 may receive a data access request from the user equipment and perform read, write, and update operations accordingly. As another example, a new storage device may be added to the storage system when the idle storage space in the storage system is in shortage. At this time, RAID server 230 may add extents in the new storage device to storage extent layer 224 for allocation. As another example, when the workload of each storage device is unbalanced, RAID server 230 may perform load balancing operations and synchronize updated address mappings to corresponding RAID clients based on the method described above.

According to an example implementation of the present disclosure, in a client/server architecture, it may not be necessary to distinguish the types of data stored, but may provide a uniform service interface to control data and user data. In this way, the complexity of the operation of the storage system can be simplified to provide higher performance.

The examples of the method according to the present disclosure have been described in detail above with reference to FIGS. 2 to 8, and the implementations of a corresponding apparatus will be described below. According to an example implementation of the present disclosure, an apparatus for managing a storage system is provided. The apparatus operates as a server of the storage system and includes: a management module, configured to manage an address mapping of the storage system, the address mapping including an association between storage spaces in a plurality of storage devices in the storage system and a user of the storage system; and a service module, configured to provide a data access service to a client associated with the user based on the address mapping. Here, the client includes at least any one of a user data client for accessing user data associated with the user in the storage system and a control data client for accessing control data associated with the user. According to an example implementation of the present disclosure, the apparatus further includes modules for performing other steps in method 300 described above.

Figure 9:
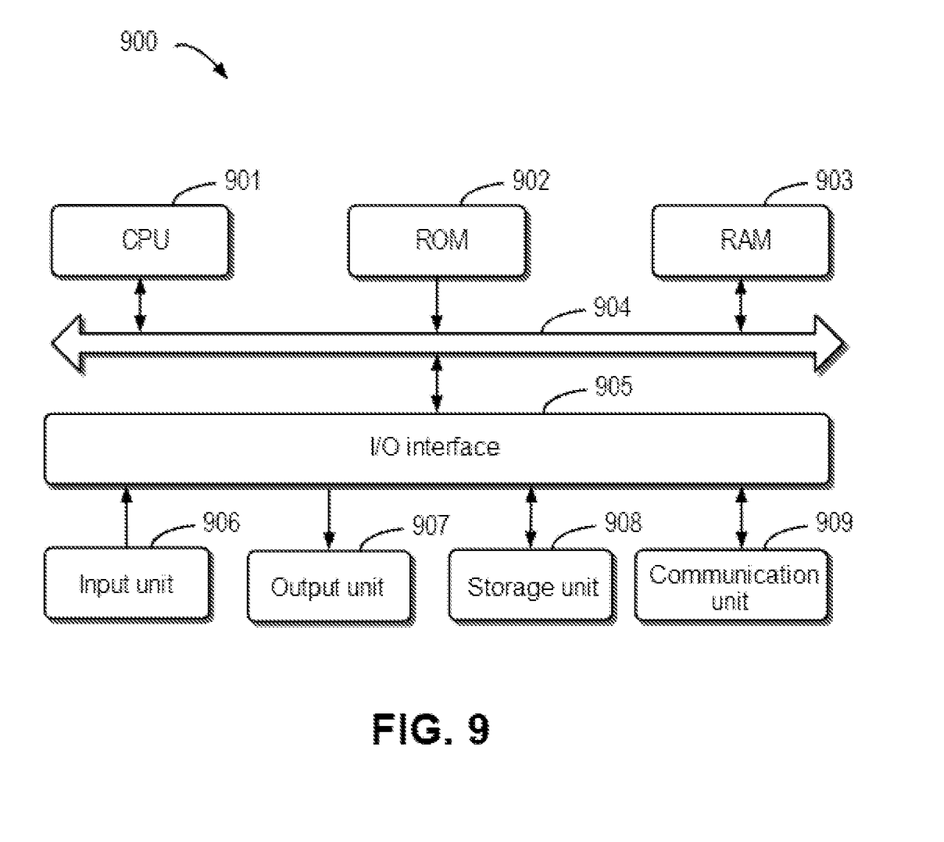
FIG. 9 schematically shows a block diagram of a device for managing a storage system according to an example implementation of the present disclosure.

FIG. 9 schematically shows a block diagram of device 900 for managing a computing system according to an example implementation of the present disclosure. As shown in the figure, device 900 includes central processing unit (CPU) 901 that may execute various appropriate actions and processing according to computer program instructions stored in read-only memory (ROM) 902 or computer program instructions loaded from storage unit 908 into random access memory (RAM) 903. Various programs and data required for the operation of device 900 may also be stored in RAM 903. CPU 901, ROM 902, and RAM 903 are connected to each other through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various processes and processing described above, such as method 300, may be executed by processing unit 901. For example, in some implementations, method 300 may be implemented as a computer software program that is tangibly included in a machine-readable medium, such as storage unit 908. In some implementations, part or all of the computer program may be loaded and/or installed on device 900 via ROM 902 and/or communication unit 909. When the computer program is loaded into RAM 903 and executed by CPU 901, one or more steps of method 300 described above may be performed. Alternatively, in other implementations, CPU 901 may also be configured in any other suitable manner to implement the above-described process/method.

According to an example implementation of the present disclosure, an electronic device includes: at least one processor; a volatile memory; and a memory coupled to the at least one processor, where the memory has instructions stored therein which, when executed by the at least one processor, cause the device to perform a method for managing a storage system. The method is implemented at a server of the storage system, and includes: managing an address mapping of the storage system, the address mapping including an association between storage spaces in a plurality of storage devices in the storage system and a user of the storage system; and providing a data access service to a client associated with the user based on the address mapping, where the client includes at least any one of a user data client for accessing user data associated with the user in the storage system and a control data client for accessing control data associated with the user.

According to an example implementation of the present disclosure, providing the data access service includes: in response to receiving an allocation request from the client for allocating a storage space to the user, acquiring a target storage space from the plurality of storage devices based on the allocation request; updating the address mapping based on the target storage space; and notifying the client of the updated address mapping such that the client accesses the target storage space via the updated address mapping.

According to an example implementation of the present disclosure, providing the data access service includes: in response to determining that the address mapping is to be updated, notifying the client of a target portion to be updated in the address mapping such that the client quiesces a data access request associated with the target portion; updating the target portion in the address mapping in response to receiving an acknowledgment from the client for the notification; and notifying the client of the updated address mapping.

According to an example implementation of the present disclosure, notifying the client of the target portion includes: instructing the client to suspend a data access request for accessing the target portion which has not been executed yet; and instructing the client to wait for completion of a data access request which is being executed for accessing the target portion.

According to an example implementation of the present disclosure, notifying the client of the updated address mapping includes: instructing the client to update an address mapping at the client by using the updated address mapping; and instructing the client to release the quiesce.

According to an example implementation of the present disclosure, providing the data access service includes: in response to determining that a failed storage device has occurred in the plurality of storage devices, determining a failed storage space involving the failed storage device in the address mapping; notifying the client of the failed storage space such that the client quiesces a data access request associated with the failed storage space; marking the failed storage space as a degraded state in response to receiving an acknowledgment from the client for the notification; and processing the failed storage device based on a threshold time length associated with the failed storage device.

According to an example implementation of the present disclosure, processing the failed storage device based on the threshold time length includes: in response to determining that the failed storage device is restored within the threshold time length, setting a state of the failed storage space to a normal state; and notifying the client that the failed storage device has been restored.

According to an example implementation of the present disclosure, processing the failed storage device based on the threshold time length includes: in response to determining that the failed storage device has not been restored within the threshold time length, notifying the client that the failed storage device has not been restored such that the client quiesces a data access request associated with the failed storage space; updating the address mapping based on a normal storage space in the plurality of storage devices; and notifying the client of the updated address mapping.

According to an example implementation of the present disclosure, notifying the client of the updated address mapping includes: instructing the client to update an address mapping at the client by using the updated address mapping; and instructing the client to release the quiesce.

According to an example implementation of the present disclosure, the storage system includes a storage system based on an RAID, and the method further includes: instructing the client to perform a reconstruction operation based on the updated address mapping.

According to an example implementation of the present disclosure, a computer program product is provided, which is tangibly stored on a non-transitory computer-readable medium and includes machine-executable instructions, where the machine-executable instructions are used to perform the method according to the present disclosure.

According to an example implementation of the present disclosure, a computer-readable medium is provided, the computer-readable medium storing machine-executable instructions which, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read only memory (EPROM or flash memory), a static random access memory (SRAM), a portable compact disk read only memory (CD-ROM), a digital versatile disk (DVD), a memory stick, a floppy disk, a mechanical encoding device such as a punch card or a protruding structure within a groove having instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for managing a storage system, the method being implemented at a server of the storage system, and the method comprising:
    managing an address mapping of the storage system, the address mapping comprising an association between storage spaces in a plurality of storage devices in the storage system and a user of the storage system;
    receiving, at the server of the storage system, a plurality of allocation requests including (i) from a user data client that manages user data in the storage system on behalf of the user, a first allocation request to increase a user data storage space allocated to the user and (ii) from a control data client that manages control metadata to support access to the user data, a second allocation request to increase a metadata storage space allocated to the user, the second allocation request having a higher priority than the first allocation request;
    providing a data access service to a client associated with the user based on the address mapping to service the second allocation request ahead of the first allocation request, the client comprising at least any one of the user data client for accessing the user data associated with the user in the storage system and the control data client for accessing the control metadata associated with the user data; and
    in response to receiving the plurality of allocation requests, determining that the address mapping is to be updated,
    wherein providing the data access service comprises:
    in response to determining that the address mapping is to be updated, notifying the client of a target portion to be updated in the address mapping such that the client quiesces a data access request associated with the target portion;
    updating the target portion in the address mapping in response to receiving an acknowledgment from the client for the notification; and
    notifying the client of the updated address mapping.

2. The method according to claim 1, further comprising:
    receiving an allocation request from the client for allocating a storage space to the user,
    wherein providing the data access service comprises: in response to receiving the allocation request from the client for allocating the storage space to the user,
        acquiring a target storage space from the plurality of storage devices based on the allocation request;
        updating the address mapping based on the target storage space; and
        notifying the client of the updated address mapping such that the client accesses the target storage space via the updated address mapping.

3. The method according to claim 1, wherein notifying the client of the target portion comprises:
    instructing the client to suspend a data access request for accessing the target portion which has not been executed yet; and
    instructing the client to wait for completion of a data access request which is being executed for accessing the target portion.

4. The method according to claim 1, wherein notifying the client of the updated address mapping comprises:
    instructing the client to update an address mapping at the client by using the updated address mapping; and
    instructing the client to release the quiesce.

5. The method according to claim 1, further comprising:
    determining that a failed storage device has occurred in the plurality of storage devices,
    wherein providing the data access service comprises: in response to determining that the failed storage device has occurred in the plurality of storage devices,
        determining a failed storage space involving the failed storage device in the address mapping;
        notifying the client of the failed storage space such that the client quiesces a data access request associated with the failed storage space;
        marking the failed storage space as a degraded state in response to receiving an acknowledgment from the client for the notification; and
        processing the failed storage device based on a threshold time length associated with the failed storage device.

6. The method according to claim 5, further comprising:
    determining that the failed storage device is restored within the threshold time length,
    wherein processing the failed storage device based on the threshold time length comprises: in response to determining that the failed storage device is restored within the threshold time length,
    setting a state of the failed storage space to a normal state; and
    notifying the client that the failed storage device has been restored.

7. The method according to claim 5, further comprising:
    determining that the failed storage device has not been restored within the threshold time length,
    wherein processing the failed storage device based on the threshold time length comprises: in response to determining that the failed storage device has not been restored within the threshold time length,
    notifying the client that the failed storage device has not been restored such that the client quiesces a data access request associated with the failed storage space;
    updating the address mapping based on a normal storage space in the plurality of storage devices; and
    notifying the client of the updated address mapping.

8. The method according to claim 7, wherein notifying the client of the updated address mapping comprises:

instructing the client to update an address mapping at the client by using the updated address mapping; and
instructing the client to release the quiesce.

9. The method according to claim 7, wherein the storage system comprises a storage system based on a redundant array of independent disks (RAID), and the method further comprises: instructing the client to perform a reconstruction operation based on the updated address mapping.

10. The method according to claim 1, wherein the address mapping includes both a user-data portion and a control-data portion, the user-data portion identifying a first storage space storing the user data, the control-data portion identifying a second storage space storing metadata of the user data, the first storage space being a different storage space than the second storage space, and
wherein the method further comprises:
after receiving a request to update the address mapping, identifying the target portion as the user-data portion and identifying the client as the user data client.

11. The method according to claim 10, wherein updating the target portion in the address mapping includes updating the user-data portion;
wherein notifying the client of the updated address mapping includes sending the updated user-data portion to the user data client;
wherein the method further comprises:
in response to determining that the address mapping is to be updated, instructing the control data client to quiesce a second data access request directed to the control-data portion;
updating the control-data portion; and
sending the updated control-data portion to the control data client.

12. The method according to claim 1, wherein the plurality of storage devices provides a common pool of unallocated storage extents; and
wherein providing the data access service includes:
assigning a first set of storage extents from the common pool to the user data storage space according to a first RAID level; and
assigning a second set of storage extents from common pool to the metadata storage space according to a second RAID level, the second RAID level being different from the first RAID level to provide multiple levels of data protection using storage extents in the common pool.

13. An electronic device, comprising:
at least one processor;
a volatile memory; and
a memory coupled to the at least one processor, wherein the memory has instructions stored therein that, when executed by the at least one processor, cause the device to perform a method for managing a storage system, the method is implemented at a server of the storage system, and the method comprises:
managing an address mapping of the storage system, the address mapping comprising an association between storage spaces in a plurality of storage devices in the storage system and a user of the storage system;
receiving, at the server of the storage system, a plurality of allocation requests including (i) from a user data client that manages user data in the storage system on behalf of the user, a first allocation request to increase a user data storage space allocated to the user and (ii) from a control data client that manages control metadata to support access to the user data,
a second allocation request to increase a metadata storage space allocated to the user, the second allocation request having a higher priority than the first allocation request; and
providing a data access service to a client associated with the user based on the address mapping to service the second allocation request ahead of the first allocation request, the client comprising at least any one of the user data client for accessing the user data associated with the user in the storage system and the control data client for accessing the control metadata associated with the user data,
wherein providing the data access service comprises: in response to determining that the address mapping is to be updated,
notifying the client of a target portion to be updated in the address mapping such that the client quiesces a data access request associated with the target portion;
updating the target portion in the address mapping in response to receiving an acknowledgment from the client for the notification; and
notifying the client of the updated address mapping.

14. The device according to claim 13, wherein providing the data access service comprises: in response to receiving an allocation request from the client for allocating a storage space to the user,
acquiring a target storage space from the plurality of storage devices based on the allocation request;
updating the address mapping based on the target storage space; and
notifying the client of the updated address mapping such that the client accesses the target storage space via the updated address mapping.

15. The device according to claim 13, wherein notifying the client of the target portion comprises:
instructing the client to suspend a data access request for accessing the target portion which has not been executed yet; and
instructing the client to wait for completion of a data access request which is being executed for accessing the target portion.

16. The device according to claim 13, wherein notifying the client of the updated address mapping comprises:
instructing the client to update an address mapping at the client by using the updated address mapping; and
instructing the client to release the quiesce.

17. The device according to claim 13, wherein providing the data access service comprises: in response to determining that a failed storage device has occurred in the plurality of storage devices,
determining a failed storage space involving the failed storage device in the address mapping;
notifying the client of the failed storage space such that the client quiesces a data access request associated with the failed storage space;
marking the failed storage space as a degraded state in response to receiving an acknowledgment from the client for the notification; and
processing the failed storage device based on a threshold time length associated with the failed storage device.

18. The device according to claim 17, wherein processing the failed storage device based on the threshold time length comprises: in response to determining that the failed storage device is restored within the threshold time length,
setting a state of the failed storage space to a normal state; and notifying the client that the failed storage device has been restored.

19. The device according to claim 17, wherein processing the failed storage device based on the threshold time length comprises: in response to determining that the failed storage device has not been restored within the threshold time length,
- notifying the client that the failed storage device has not been restored such that the client quiesces a data access request associated with the failed storage space;
- updating the address mapping based on a normal storage space in the plurality of storage devices; and
- notifying the client of the updated address mapping.

20. The device according to claim 19, wherein notifying the client of the updated address mapping comprises:
- instructing the client to update an address mapping at the client by using the updated address mapping; and
- instructing the client to release the quiesce,
- wherein the storage system comprises a storage system based on a redundant array of independent disks (RAID), and the method further comprises: instructing the client to perform a reconstruction operation based on the updated address mapping.

21. A computer program product having a non-transitory computer readable medium which stores a set of instructions to manage a storage system; the set of instructions, when carried out by computerized circuitry, causing the computerized circuitry to perform a method of:
- managing an address mapping of the storage system, the address mapping comprising an association between storage spaces in a plurality of storage devices in the storage system and a user of the storage system;
- receiving, at the server of the storage system, a plurality of allocation requests including (i) from a user data client that manages user data in the storage system on behalf of the user, a first allocation request to increase a user data storage space allocated to the user and (ii) from a control data client that manages control metadata to support access to the user data, a second allocation request to increase a metadata storage space allocated to the user, the second allocation request having a higher priority than the first allocation request; and
- providing a data access service to a client associated with the user based on the address mapping to service the second allocation request ahead of the first allocation request, the client comprising at least any one of the user data client for accessing the user data associated with the user in the storage system and the control data client for accessing the control metadata associated with the user data,
- wherein providing the data access service comprises: in response to determining that the address mapping is to be updated,
  - notifying the client of a target portion to be updated in the address mapping such that the client quiesces a data access request associated with the target portion;
  - updating the target portion in the address mapping in response to receiving an acknowledgment from the client for the notification; and
  - notifying the client of the updated address mapping.

* * * * *